(12) United States Patent
Branman (10) Patent No.: US 7,219,467 B1
(45) Date of Patent: May 22, 2007

(54) PLANT SUPPORT SYSTEM

(76) Inventor: Maya Branman, 246 Krumville Rd., Olivebridge, NY (US) 12461

( * ) Notice: Subject to any disclaimer, the term of this patent is extended or adjusted under 35 U.S.C. 154(b) by 0 days.

(21) Appl. No.: 11/113,087

(22) Filed: Apr. 22, 2005

(51) Int. Cl.
*A01G 17/06* (2006.01)
(52) U.S. Cl. ......................................................... 47/45
(58) Field of Classification Search .................. 47/70, 47/44–47, 42
See application file for complete search history.

(56) References Cited

U.S. PATENT DOCUMENTS

| | | | | |
|---|---|---|---|---|
| 212,604 | A | * | 2/1879 | Jenks ............................. 47/47 |
| 456,175 | A | | 7/1891 | Van Orman |
| 587,581 | A | | 8/1897 | Horan |
| 603,754 | A | | 5/1898 | Baldwin |
| 760,879 | A | | 5/1904 | Kunzman |
| 915,146 | A | * | 3/1909 | Woerner ........................ 47/47 |
| 947,912 | A | * | 2/1910 | Jaquet .......................... 47/46 |
| 1,218,115 | A | * | 3/1917 | Phillipps ....................... 47/47 |
| 1,529,705 | A | * | 3/1925 | McKnight ...................... 47/44 |
| 1,893,970 | A | * | 1/1933 | Takahashi ..................... 47/55 |
| 2,083,256 | A | * | 6/1937 | Rinker ......................... 47/47 |
| 2,083,526 | A | * | 6/1937 | Rinker ......................... 47/47 |
| 2,125,204 | A | * | 7/1938 | Shrewsbury .................... 47/47 |
| 2,229,527 | A | * | 1/1941 | Schouman ...................... 47/47 |
| 2,447,444 | A | * | 8/1948 | Waite .......................... 52/157 |
| 4,005,548 | A | | 2/1977 | Nahon |
| 4,026,068 | A | | 5/1977 | Tepper |
| 4,073,091 | A | * | 2/1978 | Vogel .......................... 47/45 |
| 4,894,951 | A | | 1/1990 | Risley |
| 5,179,799 | A | * | 1/1993 | Hillestad ....................... 47/45 |
| 5,249,390 | A | | 10/1993 | Purohit et al. |
| 5,323,559 | A | | 6/1994 | Allman |
| 5,425,203 | A | | 6/1995 | Scott |
| 5,640,802 | A | | 6/1997 | Elliott |
| 5,913,477 | A | | 6/1999 | Dean |
| 6,088,956 | A | * | 7/2000 | Rocka ........................... 47/45 |
| 6,311,428 | B1 | | 11/2001 | Marino et al. |
| 6,378,245 | B1 | | 4/2002 | Summers |
| 6,389,744 | B1 | | 5/2002 | Pugh |
| 6,434,883 | B1 | | 8/2002 | Martin |
| 6,490,825 | B1 | | 12/2002 | Dillon et al. |
| D512,745 | S | * | 12/2005 | Kaplan et al. ............... D20/43 |
| D515,142 | S | * | 2/2006 | Kaplan et al. ............... D20/43 |
| 2004/0093792 | A1 | | 5/2004 | Avery |

FOREIGN PATENT DOCUMENTS

JP 05003727 A * 1/1993

OTHER PUBLICATIONS

Gardener's Supply Company, catalog, Spring 2005, pp. 10-13, Burlington VT.

* cited by examiner

*Primary Examiner*—Son T. Nguyen (57) ABSTRACT

A plant support system having one or more stakes and a length of cord, string, wire, or twine. The stakes have a lower end (30) connected to a lower length (32) that when placed in soil supports the stake. The lower length is connected to a length consisting of left (22) and right (20) corrugations or is otherwise suitably shaped so that when cord, string, wire or twine is attached at predetermined heights the twine (43) will not slip up or down. There may be a loop at the top (24) to secure the twine. Stakes are placed into the soil at predetermined distances from one another and from plants, and twine is attached to stakes along the length that is corrugated or otherwise suitably shaped. The stakes and twine are easy to install and provide plentiful support for growing plants.

1 Claim, 9 Drawing Sheets

PLANT SUPPORT SYSTEM

CROSS REFERENCE TO RELATED APPLICATIONS

Not Applicable

FEDERALLY SPONSORED RESEARCH

Not Applicable

SEQUENCE LISTING OF PROGRAM

Not Applicable

BACKGROUND OF INVENTION

1. Field of the Invention

This present invention relates to devices for supporting growing plants and, more particularly, a structure and support system for plants.

2. Discussion of Prior Art

It is known that many plants, especially climbing and vining plants, show improved growth when they are supported off the earth. It is desirable to support certain plants off the earth to keep them clean and safe from animals and diseases. Because of the temporary nature of the growing season in some areas, the requirements of crop rotation for the health of plants, and the harsh winter conditions in some areas, it is advantageous to have structures that are easy to assemble, disassemble, store and move. Simpler structures tend to cost less, which is an advantage to the home gardener and commercial gardener alike. Easy access to the growing plants and their produce is important.

There are many structures and systems for the support of plants. The various combinations of poles, slats, cords and wires, as well as metal, concrete and wood structures are currently in use. Most of these are not designed with the possibility of installing them and then adding support after the plant has grown. Support systems for plants sometimes comprise numerous components, which makes assembly difficult and time consuming. They may involve parts that are attached, and parts that are not malleable and need to be attached after they are placed in the soil. Most systems contain multiple parts and are vulnerable to weather, rust (if metal) and other damage especially at the joints. Damage and wear is also caused by stress and movement to plant support systems during assembly, disassembly, while the plants are being tended, and while produce is being harvested. Plant supports that are soldered can break at the joints and may be rendered useless after a few seasons use. Many plant support structures have two or more connected sections that need to be placed in the soil a particular distance from one another. This creates a problem. Some are shaped in a particular way to require their placement in the soil in a specific way. The gardener must adjust their planting plan to the shape of the plant support structure. Many of these support systems require that two or more of their parts, usually the stake section, are put into the soil at once, which is difficult to accomplish and puts stress on the structure as a whole, sometimes throwing it askew, and possibly frustrating the gardener.

While there are many designs that adequately support plants, many have disadvantages that reduce their usefulness by being complicated, cumbersome, unattractive for home use, difficult to assemble and disassemble, difficult to store, expensive to produce, and of limited design flexibility that does not allow for individual creative use.

The tomato plant support described in U.S. Pat. No. 4,026,068 entitled "Support For A Tomato Plant" to Tepper, is confined to the use of plural upright members in surrounding relation about the plant with lateral members extending from the upright members. These lateral members, which are connected to the vertical member, can be broken during storage and use. Although the tomato plant support allows growth of the plant without manually moving the vine as it grows, mechanical and manual harvesting of the tomato is difficult. As the tomato plant grows the tomato can become entangled within the support structure and the vines of the tomato plant making disassembly difficult. This support does not allow for adding supports if the plant grows lengthy vines, which may extend far outward of the original intended space, and is likely in many varieties of tomato. Some plants may not grow as well as anticipated and may need to be removed to make way for healthier ones. Removal and replanting without doing damage to the new plant would be difficult with this system, as the support blocks access from all sides. This support needs to be installed early on. Many gardeners do not install their support systems on time. They plant and then when the plant is falling over they rush in to add support systems. This system cannot be used at this late time. The lateral members of this support will break the branches of the tomato plant and if there are tomatoes on the vine they will be likely to be damaged too.

U.S. Pat. No. 4,894,951 shows a cage-like structure that may be expensive to produce, and is likely to be difficult to disassemble when vines have entwined themselves around it. Installing it in the soil appears to require coordination, because the posts have to be placed all at once, and harvesting seems like it could be inconvenient because it does not provide adequate space to reach through. Plant and produce damage may result during harvest. This system does not address climbing plants such as beans and peas. Gardeners will have to purchase another system if they are growing beans. They will have to purchase and separately store and organize multiple systems for different varieties of fruit and vegetables planted.

The trellis described in U.S. Pat. No. 6,378,245 B1 entitled "Versatile Trellis Kit" to Summers, is confined to a T-shaped support structure with hooks for hanging a net. While the trellis supports plants off the ground, the vertical structure is difficult to assemble. In Northern areas, when the growing season is over, plant support structures, especially those with netting, may need to be disassembled before snows and ice storms do damage to them. One of the more difficult aspects of disassembling a plant support structure is separating the plant, whose vines have wound around the structure, in this case the netting, from the structure. This is a time consuming process which may lead to damage to the netting, as plant vines are strong. When cutting the vines away from the netting, there is a risk that the netting may accidentally be cut also. This structure needs to be assembled before the plants have grown to a height in which the support is needed. Many gardeners, especially beginning gardeners, do not install proper support early enough. They wait for the plant to grow first. This support will be of no use to them.

The support system described in U.S. Pat. Application No. 20040093972 is useful for separating fruit from vines, but does not address the difficulty of having to reach under the canopy created by the angle member in order to gather fruit. Because the top section of the structure is closer to the person harvesting the fruit, the person must crouch down and reach underneath it to access fruit growing closer to the ground. This may tire people out and cause back and knee strain, especially in larger planting areas and farms. This support system does not address the angle of the sun in relation to the growing fruit and vegetables. When the sun goes overhead, then passes the zenith, it shines on the other side of the plant. In this patent, leaves are separated from the vegetable and fruit, and adequate shade may not be provided for part of the day. This could adversely affect growth and taste of the produce. This system does not address the whole range of plants including flowers.

The plant support described in U.S. Pat. No. 6,311,428 consists of a multipart structure that supports netting. These kinds of structures, while useful for plant growth during the season, have a few problems associated with them. The first is that they are a particular size and shape, and require the planting area to be that size and shape. For instance they do not accommodate curved, angled and small planting area spaces. Secondly, assembly and disassembly is time consuming. It is disadvantageous to be using a costly product such as netting, which may be accidentally cut and damaged, during the tedious removal of vines during and after the growing season. Thirdly, if the plant does not grow such that it leans against the structure, if it grows away from the structure, additional support is needed and cannot be easily added because access to the produce will be impeded by the plant support.

The vine support described in U.S. Pat. No. 6,434,883 B1 entitled "Vine Support With Snap-in Cross Arm" to Hilmar, consists of a vertical stake with a slotted aperture and cross arm, wherein wire is carried by the cross arm to support the vine. Although the vine support structure is less labor intensive to install at the farm site over the prior art, its assembly requires a lot of pieces to snap-fit together. This structure is complicated to assemble. Over time the snap-fit connections become loose and eventually the snap-fit connections will fail. Consequently, the vine support structure cannot withstand mechanical and manual harvesting over long periods of time.

The support structure in U.S. Pat. No. 5,913,477 entitled "Modular Plant Support and Irrigation System" to Dean, is confined to a structure with interlocking tubes, connectors and planar hubs forming a module. Although the structure is aesthetically pleasing with different architectural designs, the structure does not allow for mechanical and manual harvesting of free hanging fruits and vegetables. The interlocking tubes, connectors and planar hubs, along with the various architectural designs make the structure difficult and time consuming to assemble and disassemble. Planting areas are of many sizes and shapes and slopes. Some planting areas are on a hill. A structure like this would require flat ground and a particular amount of space, which limits it usefulness.

Finally, it would also be advantageous to make such a support that was ornamental in design. This structure is unnatural looking. Many home gardeners prefer the planting area to be aesthetically pleasing rather than to look like a factory.

OBJECTS AND ADVANTAGES

Accordingly, several objects and advantages of the present invention are:

(a) To provide a plant support system that is easy to assemble and dismantle.

(b) To provide a plant support system that will not corrode, wear out and break easily and is designed without joints and soldered parts, which are susceptible to rust, wear, and breakage.

(c) To provide a plant support system that allows produce to be easily reached for harvest.

(d) To provide a plant support system that can be used in most any gardening areas for all types of plants, including tomatoes, beans, peas, flowers and other vegetables (e) To provide a plant support system that can be assembled without damaging plants that have already grown and require more support.

(f) To provide a plant support system that can be moved, adjusted and readjusted any time to fit changing conditions.

(g) To provide a plant support system that uses the natural disposition of plants to receive nourishment and to provide shade to produce by allowing the leaves to remain in their natural position.

(h) To provide a plant support system that is inexpensive to produce.

(i) To provide a plant support system that can be produced in a variety of sizes to fit a variety of uses and space sizes, that will support short plants and tall plants.

(j) To provide a plant support system that when not in use, can be stored and organized in a small space.

(k) To provide a plant support system that is attractive.

Further objects and advantages are to provide a plant support system that can last a long time, will not warp and be easily subject to structural deformation, and allows the individual gardener to make decisions as needed based on their knowledge of their environment and their gardening plans.

Still further objects and advantages will become apparent from consideration of the ensuing description and drawings. Although I have specifically described the construction and relative arrangement of the several elements of my invention, I do not desire to be confined to the same, as such changes and modifications may be made as clearly fall within the scope of my invention without departing from the spirit thereof.

SUMMARY

It is an object of the invention to provide a versatile structure that overcomes the disadvantages of the discussed prior art.

In accordance with the present invention a structure comprising one unitary stake, used at least twice and in some of the other embodiments where two stakes are combined to make one stake, used at least once. Cord, string, wire, twine or other suitable material is connected to the stake or stakes as many times as necessary to create further supports thus making a structure which is used for plant support. This new plant support system provides an attractive, stable, easily assembled, plant support. It provides a long-term solution for plant support, as it is designed to resist damage, and can be adjusted to most conditions.

DRAWINGS—FIGURES

The present invention will be more fully understood by reference to the following drawings, which are for illustrative purposes only.

DRAWINGS—REFERENCE NUMERALS 20 right convex shaping of corrugation
21 top end
22 left convex shaping of corrugation
24 top closed shape
25 top arc
26 left convex shaping of corrugation
27 right convex shaping of corrugation
28 top end
30 tapered bottom end
31 bottom end
32 lower length
33 middle section
34 loop
36 length between loops
37 arc connects two stakes
38 top loop
40 end of top closed shape
41 twine goes through
43 twine wraps
44 length of twine
45 end closure of twine or other suitable material
46 vertical length of twine
47 end of twine
49 twine goes through hole
60 tapered bottom end
61 front surface plane
62 tapered length
63a inner side surface plane
63b outer side surface plane
64 hole
65 top arc
66 top
68 front surface plane
69 side surface plane
70 front surface plane
72 tapered length
73a inner side surface plane
73b outer side surface plane
74 front surface plane
75 side surface plane
76 concave curve of corrugation
77 convex curve of corrugation
78 flat top
79 rounded top
80 hole
81 front surface plane
82 soil
83 top line of soil
84 plant roots
86 plant
90 shaped length of loops
92 shaped length of rounded corrugations
94 shaped length of zigzags

Figure 1:
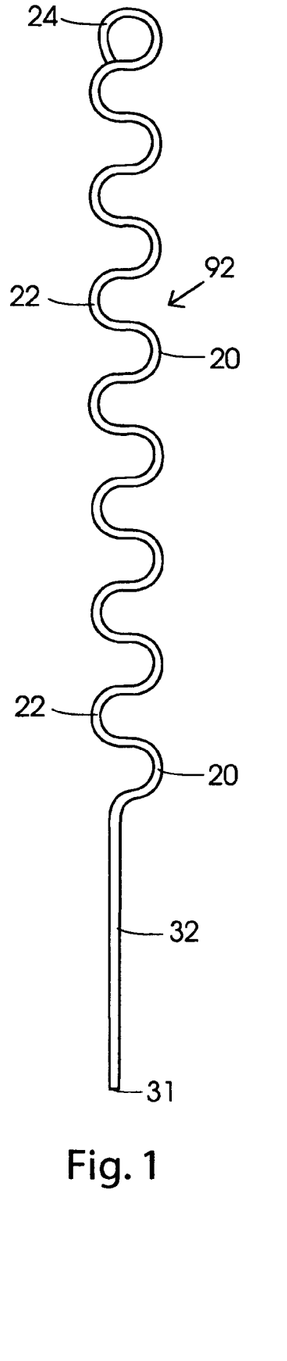
FIG. 1 is a perspective view of one stake.
Figure 2:
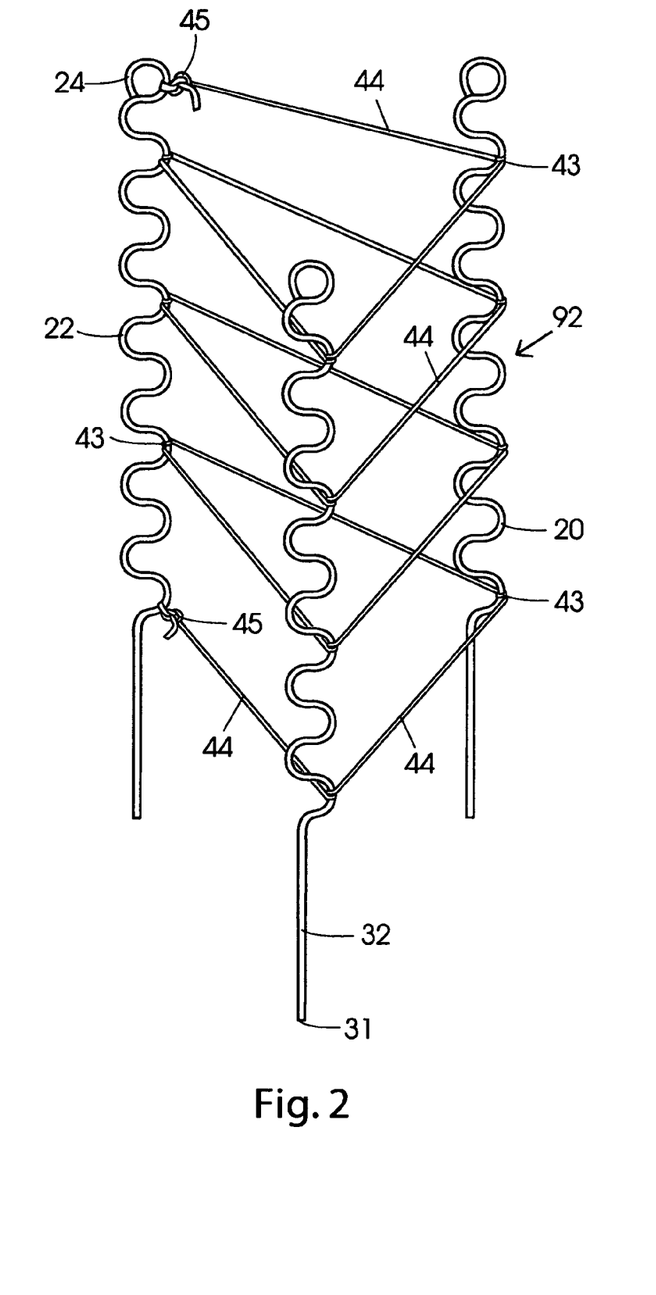
FIG. 2 is a perspective view of the plant support system in the preferred embodiment set up in one possible configuration for plant support.

DETAILED DESCRIPTION—PREFERRED EMBODIMENT FIG. 1 AND FIG. 2

With reference now to the drawings in more detail, it can be seen that there is illustrated in FIG. 1 a unitary stake comprising bottom end 31, for penetrating the soil, lower length 32, shaped length of rounded corrugations 92 including left convex shaping of corrugations 22 and right convex shaping of corrugations 20, and top closed shape 24.

FIG. 2 shows the preferred embodiment of the plant support system in one of the many possible configurations. Three stakes are arranged at a distance from one another in a triangle configuration to surround a plant. Bottom end 31 of each stake is pushed into the soil the length of lower length 32 to provide support for the stake. Shaped length of rounded corrugations 92 including left convex shaping of corrugations 22 and right convex shaping of corrugations 20 so that twine, cord, string, wire or other suitable material to be tied or knotted or otherwise connected at end closure of twine or other suitable material 45 to one stake and then to wrap 43 around the next stake to secure it at a particular height and then to the next stake. This creates generally horizontal and sometimes angled lengths of twine 44. Twine is attached in that manner from that stake to the next stake attaching to higher levels of the stake as required by the plant for support of stems and produce. Stakes can be arranged in many ways, in lines, zigzags, circles and any shape around and among the plants.

Figures 3, 4, 5:
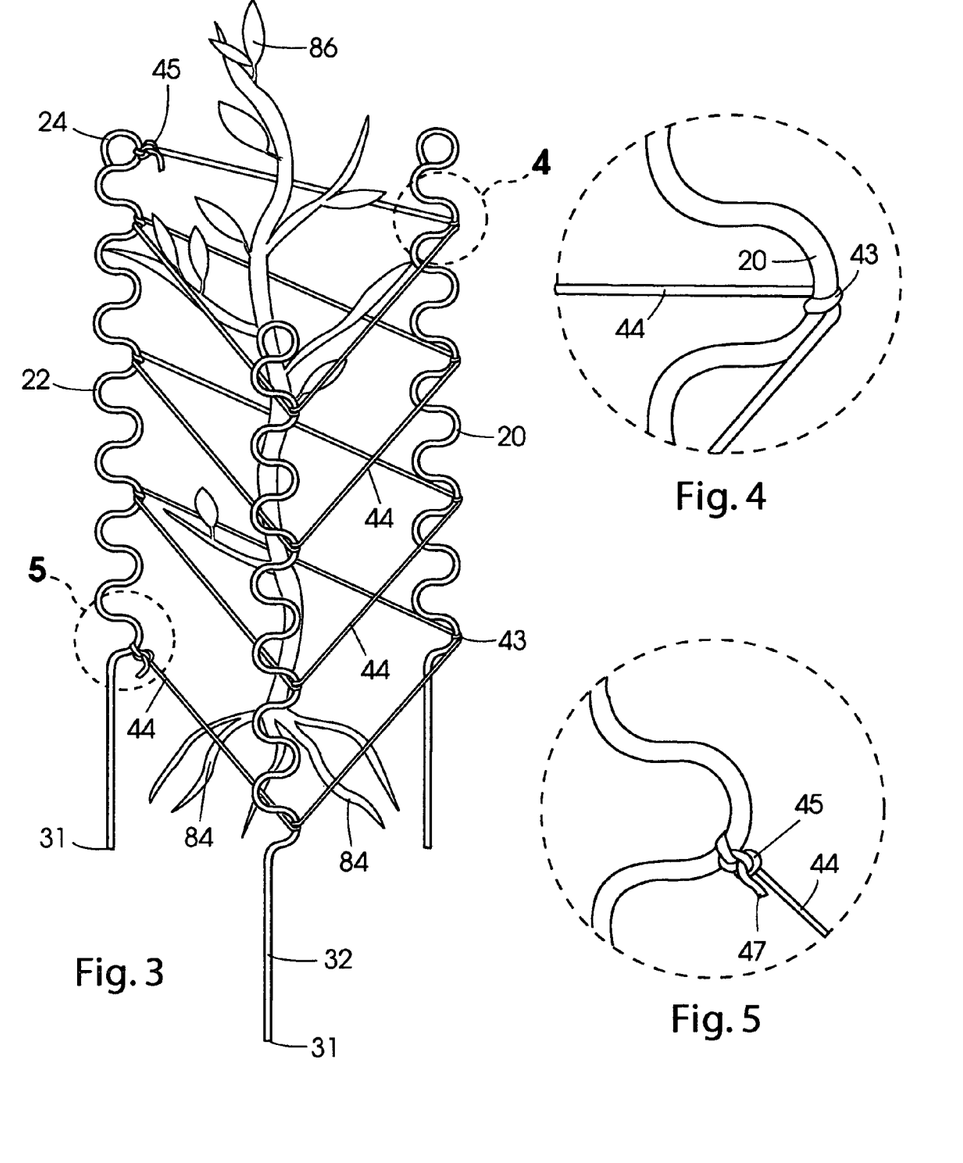
FIG. 3 illustrates the preferred embodiment set up in one possible configuration for plant support with a plant
FIG. 4 is an enlargement of the connection of the twine to the stakes.
FIG. 5 is an enlargement of the end connection, or knot, of the twine to the stake.

FIG. 3 shows the same configuration of three stakes as FIG. 2 with plant 86 inside of the triangle. The plant roots 84 sit below the soil as do lower lengths 32, which are stuck into the soil.

FIG. 4 shows twine wrapped 43 around the stake at right convex shaping of corrugation 2.

FIG. 5 shows knot 45 with end of twine 47 attached to the corrugation.

DESCRIPTION—ALTERNATE EMBODIMENTS—FIGS. 6, 7, 8, 9, 10, 11

Figure 6:
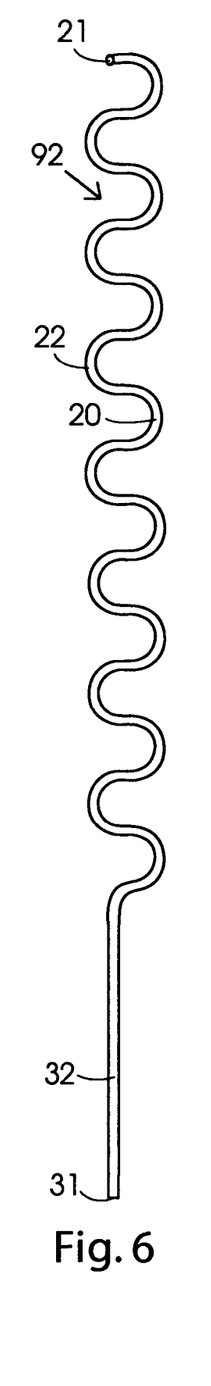
FIG. 6 illustrates an alternate embodiment of one stake without the top closed shape.

FIG. 6 shows an alternative embodiment of the stake, with bottom end 31, lower length 32, shaped length of rounded corrugations 92 including left convex shaping of corrugations 22 and right convex shaping of corrugations 20, and top end 21.

Figure 7:
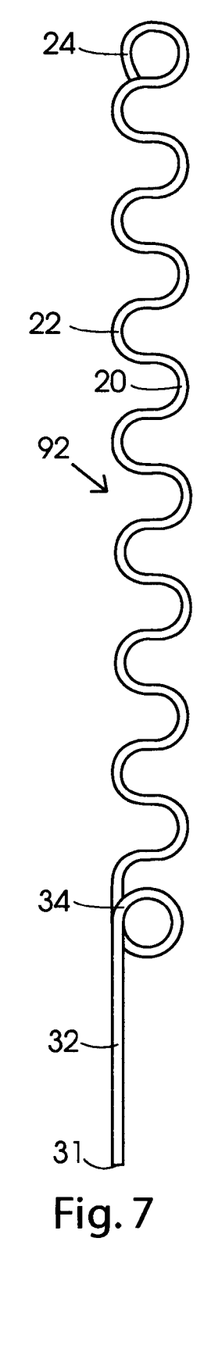
FIG. 7 illustrates an alternate embodiment of one stake with a closed shape above and below the shaped section.

FIG. 7 shows an alternate embodiment of the plant support stake with bottom end 31, lower length 32 and added loop 34 for securing the twine, just below shaped length of rounded corrugations 92.

Figure 8:
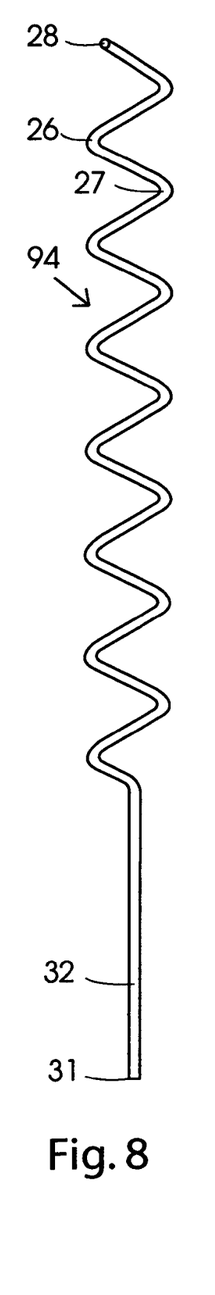
FIG. 8 illustrates an alternate embodiment of one stake with the shaped length in zigzags.

FIG. 8 shows an alternate embodiment of the plant support stake with bottom end 31, straight length 32, shaped length of zigzags 94 including left convex shaping of corrugations 26 and right convex shaping of corrugations 27, and top end 28.

Figure 9:
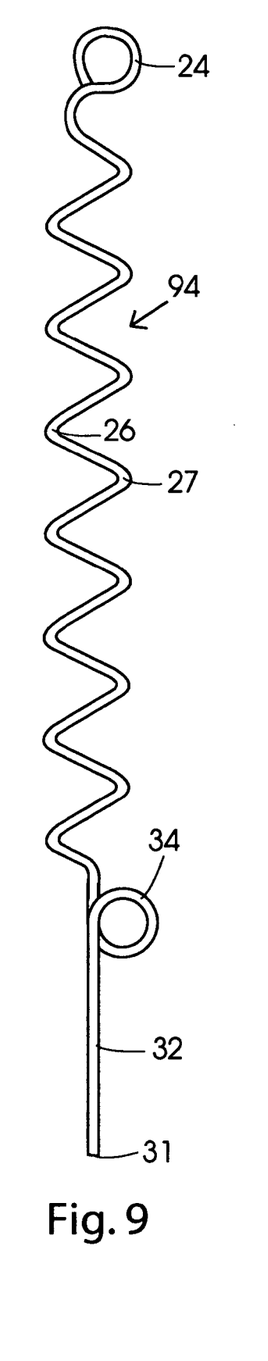
FIG. 9 illustrates an alternate embodiment of one stake with the shaped length in zigzags and with a closed shape above and below the shaped section.

FIG. 9 shows an alternate embodiment, bottom end 31 for penetrating the soil, loop 34 placed above lower length 32, shaped length of zigzags 94 including left convex shaping of corrugations 26 and right convex shaping of corrugations 27, with top closed shape 24 for securing the twine. While I prefer rounded corrugations that are at least 2.5 centimeters wide, the corrugations could be triangular as in this embodiment, oval, rectangular, and other shapes, and the corrugations could be wider or narrower than 2.5 centimeters.

DESCRIPTION—VARIOUS ALTERNATE EMBODIMENTS—FIGS. 15–21

Figure 15:
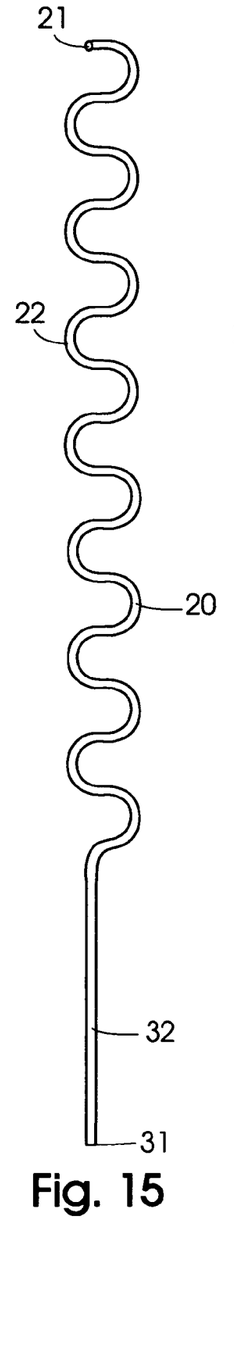
FIG. 15 illustrates an alternate embodiment with rounded corrugations and no loops.

FIG. 15 shows alternate embodiment of the plant support stake as seen in FIG. 1 with flat bottom end 31 and top end 21 rather than a loop.

Figure 16:
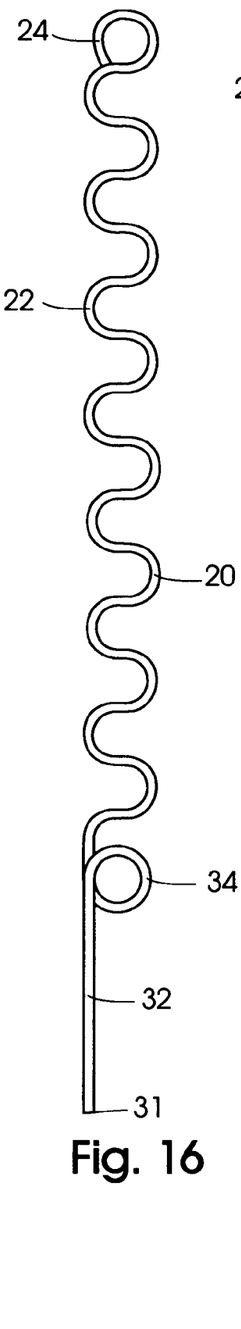
FIG. 16 illustrates an alternate embodiment with rounded corrugations and two loops.

FIG. 16 shows an alternate embodiment of the plant support stake as seen in FIG. 1 with flat bottom end 31 and loop 34, for securing the twine, above lower length 32.

Figure 17:
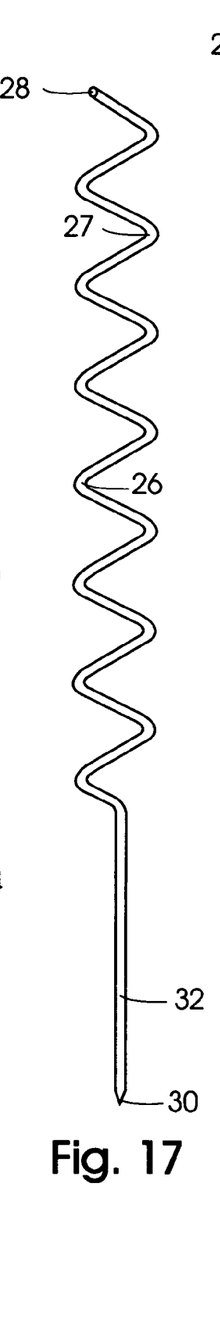
FIG. 17 illustrates an alternate embodiment with triangular corrugation.

FIG. 17 shows an alternate embodiment of the plant support stake with tapered bottom end 30, to easily penetrating the soil, straight length 32, the length of which is pushed into the soil to provide support for the stake, a section or length of triangular corrugations comprising left convex shaping of corrugations 26 and right convex shaping of corrugations 27, and top end 28.

Figure 18:
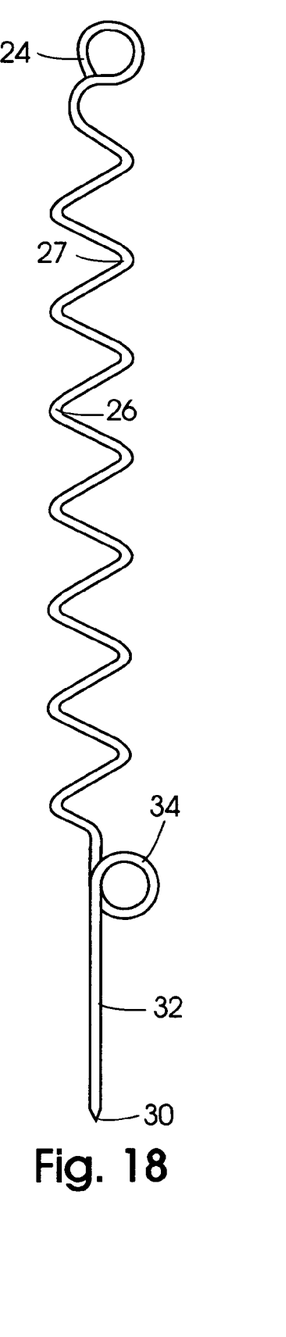
FIG. 18 illustrates a stake with triangular corrugation and two loops.
Figure 19:
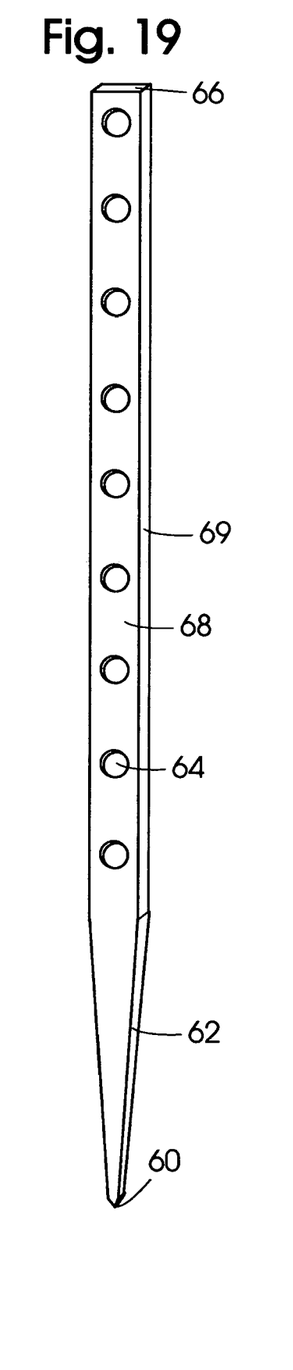
FIG. 19 illustrates an alternate embodiment comprising a flat piece of suitable material with holes.
Figure 20:
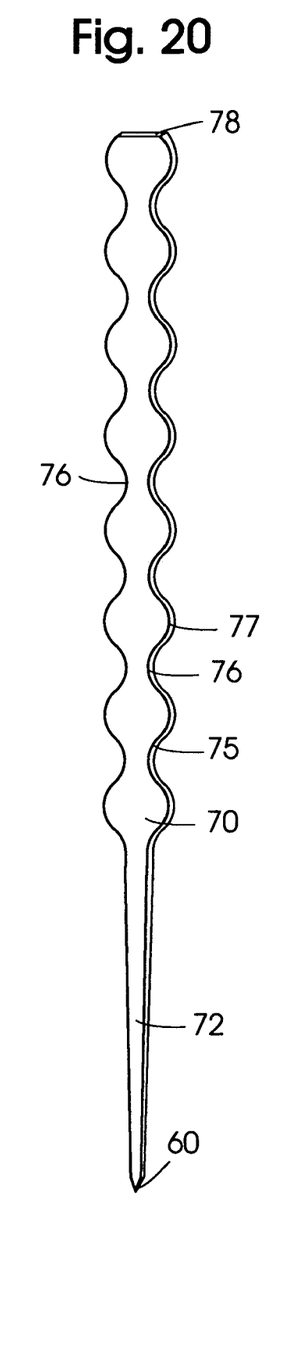
FIG. 20 illustrates an alternate embodiment comprising a flat piece of suitable material with curves.
Figure 21:
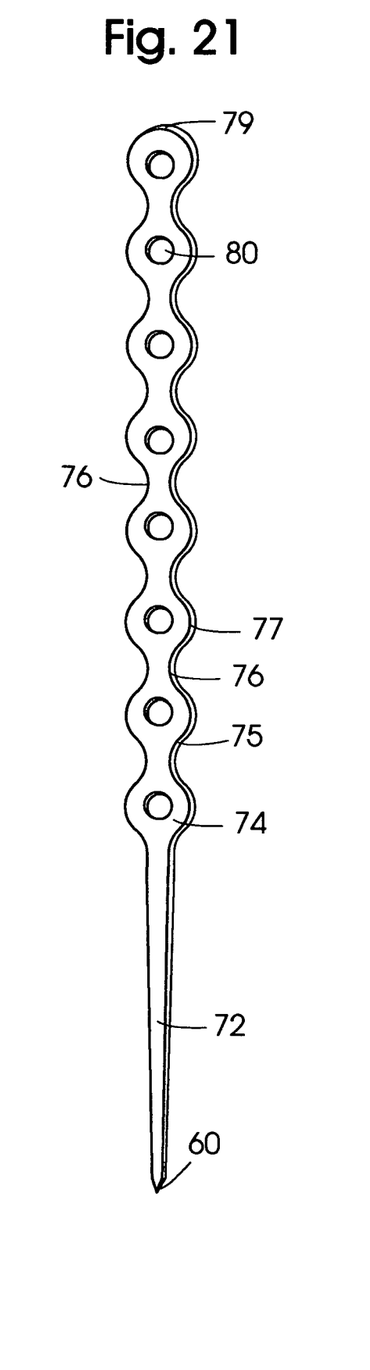
FIG. 21 illustrates an alternate embodiment comprising a flat piece of suitable material that is curved and has holes.
Figure 22:
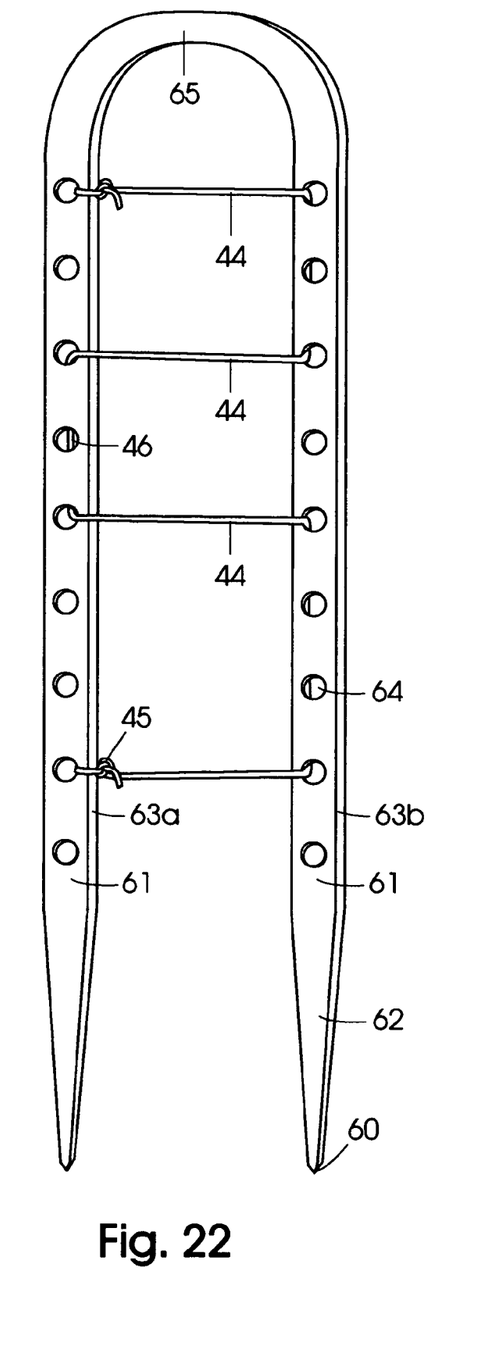
FIG. 22 illustrates an alternate embodiment of the stake in FIG. 19.
Figure 23:
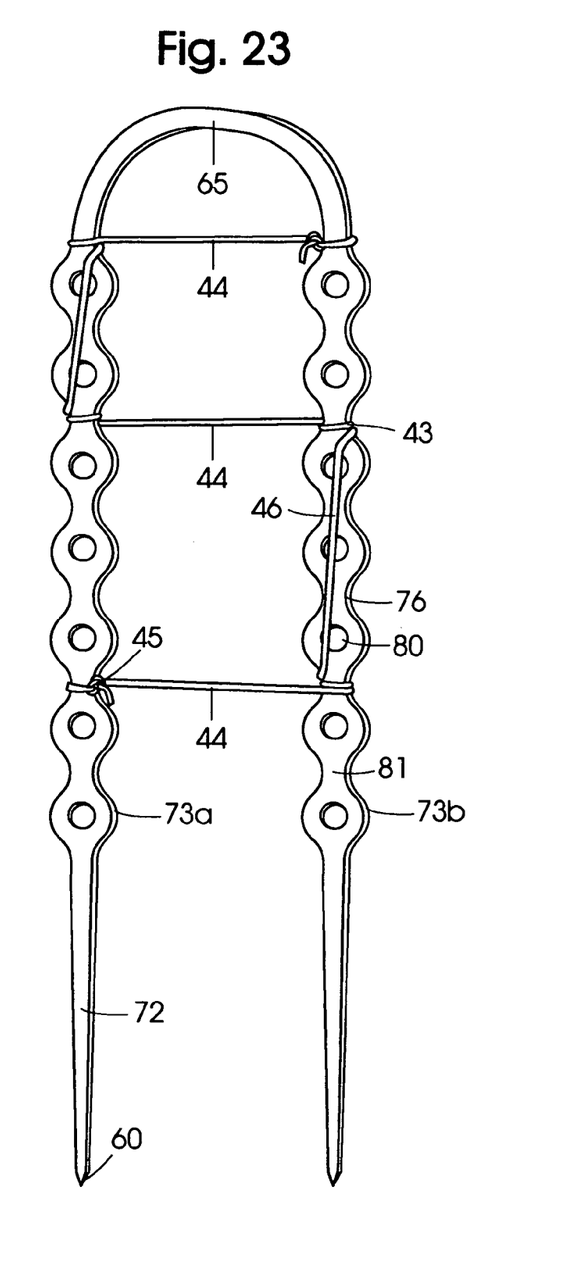
FIG. 23 illustrates an alternate embodiment of the stake in FIG. 21.
Figures 24, 25, 26:
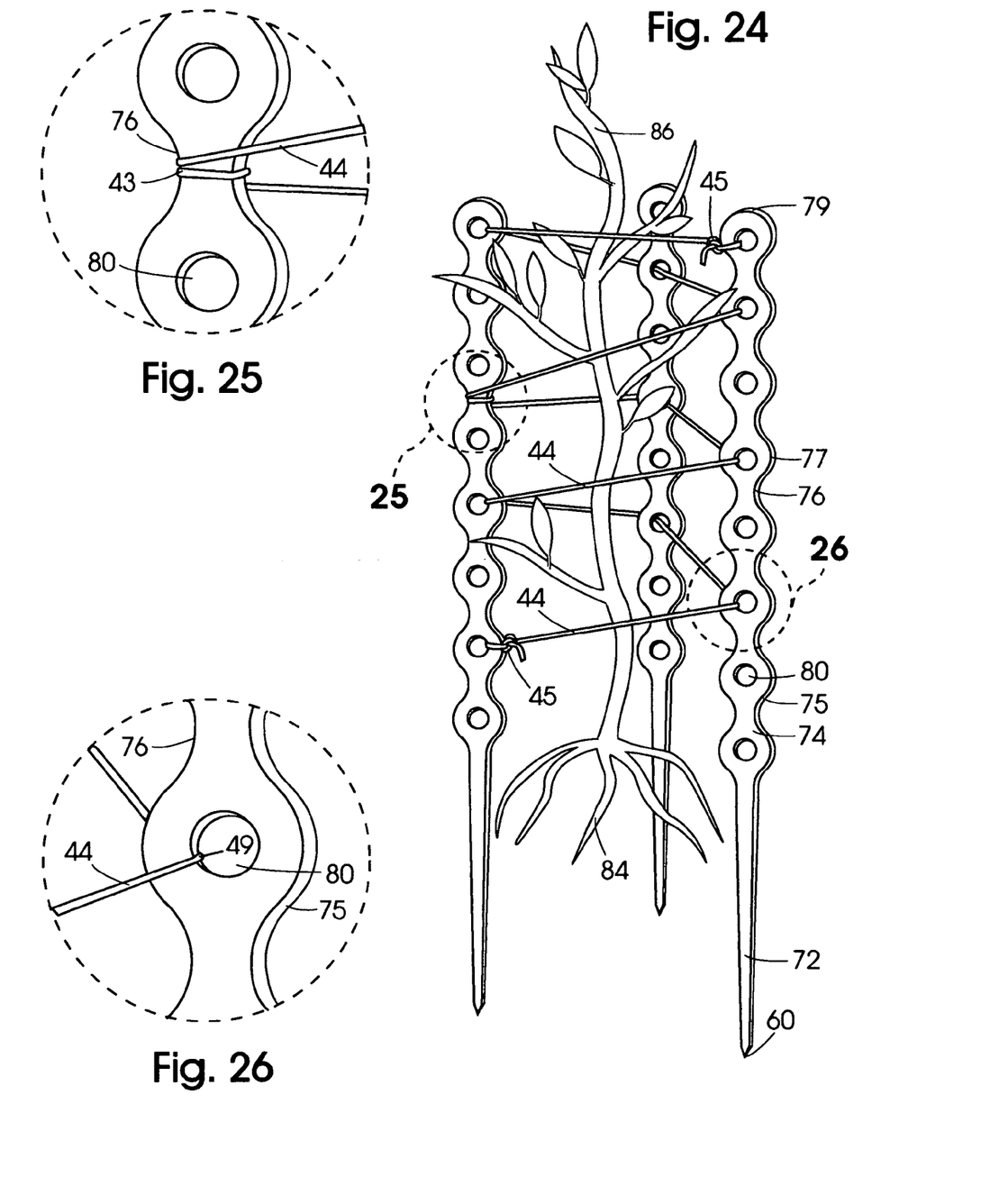
FIG. 24 illustrates several stakes of an alternate embodiment as would be seen in a planting area supporting a plant.
FIG. 25 is an enlargement of the twine wrapping around the stake.
FIG. 26 is an enlargement of the twine going through the hole in the stake.

FIG. 18 shows an alternate embodiment with triangular corrugation, tapered bottom end 30 for penetrating the soil, above lower length loop 34, lower length 32, the length of which is pushed into the soil to provide support for the stake, a section of triangular corrugations comprising left convex shaping of corrugation 26 and right convex shaping of corrugation 27 with loop at the top 24 for securing the twine. While I prefer rounded corrugations that are at least 2.5 centimeters wide, the corrugations could be triangular as in this embodiment, oval, rectangular, and other shapes, and the corrugations could be wider or narrower than 2.5 centimeters.

FIG. 9 shows the front side of an alternative embodiment of the stake, with bottom end 30, lower length 32, shaped length of loops 90 including loops 34 and lengths between loops 36, then top closed shape 38.

Figure 10:
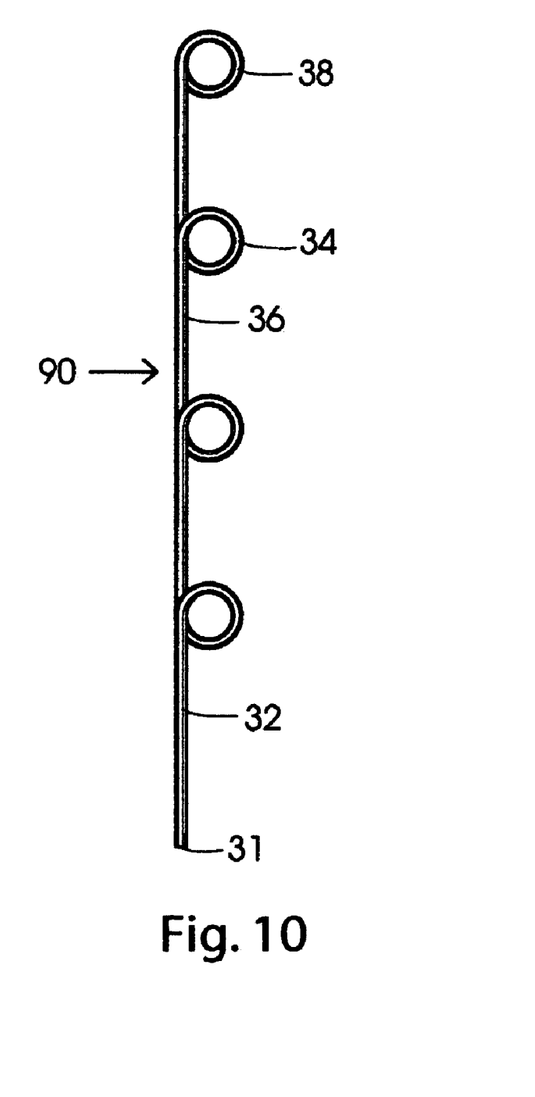
FIG. 10 illustrates a front view of an alternate embodiment of one stake with the shaped section composed of loops.
Figure 11:
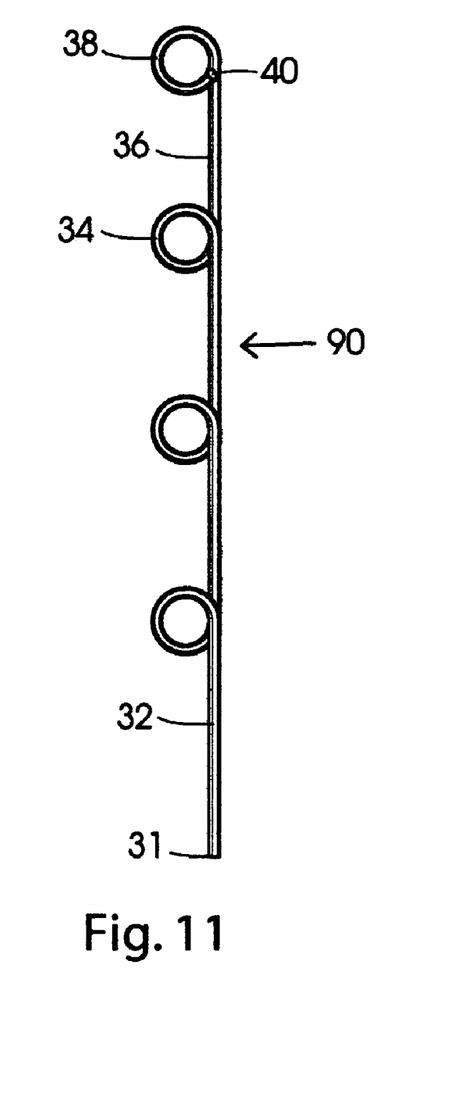
FIG. 11 illustrates a back view of an alternate embodiment of one stake with the shaped section composed of loops.

FIG. 10 shows the back side an alternative embodiment of the stake, with bottom end 30, lower length 32, shaped length of loops 90 including loops 34 and lengths between loops 36, top closed shape 38, and end of top closed shape 40.

Figure 12:
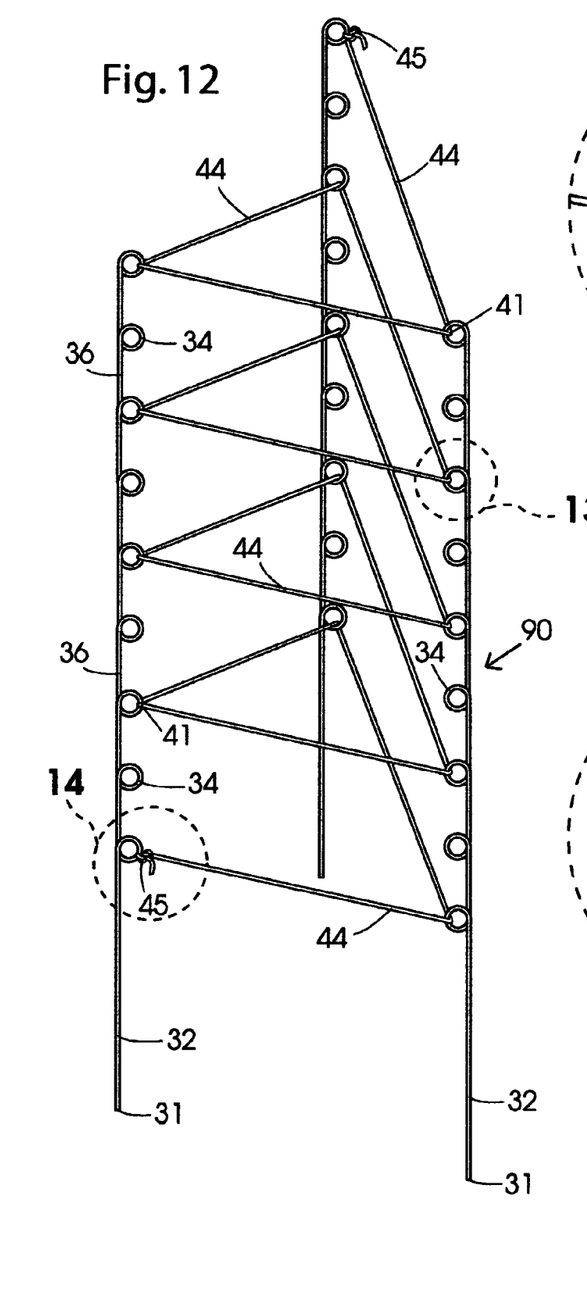
FIG. 12 illustrates the support system in an embodiment with the shaped section composed of loops in one possible configuration for planting.
Figure 13:
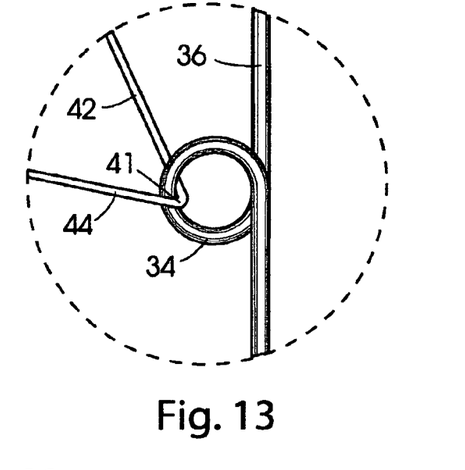
FIG. 13 illustrates an enlargement of the connection of the twine to the stake.
Figure 14:
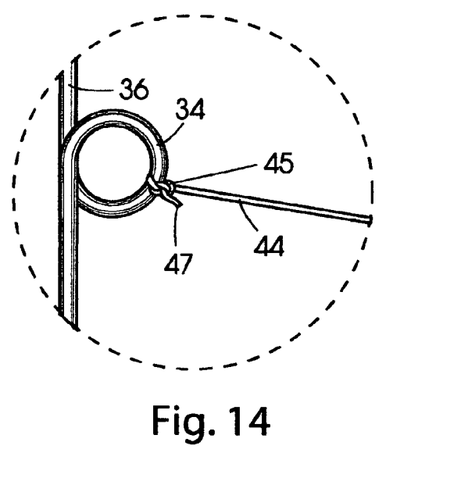
FIG. 14 illustrates an enlargement of the knot of twine attached to the stake.

OPERATION—ALTERNATE EMBODIMENT—FIGS. 12, 13, 14

FIG. 12 shows one of many possible configurations for the plant support system. Three stakes are arranged at a distance from one another in a triangle configuration to surround a plant Cord, string, wire or twine is knotted or tied 45 to the loop in one stake. Twine is either wrapped 43 around the loop or sent through 41 the loop in the next stake and from that stake to the next stake attaching to higher loops of the stake as required by the plant for support creating lengths of twine 44 to give support for the plant, stems, and produce.

FIG. 13 shows one way in which the twine can go through 41 loop 34 in order to be secured in place.

FIG. 14 shows twine tied in knot 45 with end of twine 47 attached to loop 34.

Advantages

From the above description above, a number of advantages of my plant support system become evident:

(a) Vertical supports are placed into the ground one by one in any configuration required by the gardener. Twine is attached to the vertical supports as needed for additional support. Twine can be cut and attached anywhere. To disassemble the plant support system twine can either be rolled up for reuse and it can be cut apart and replaced. Twine is inexpensive so it is not a big investment. The stakes are lifted from the ground. This makes this system easy to assemble and disassemble.

(b) There are no joints in this plant support system. There is no place for rust and wear to begin to weaken the plant support.

(c) Produce can be easily reached through the twine when it is time to harvest.

(d) Any number of these stakes in a variety of heights can be used in many configurations to accommodate any number of plants of most any height. This plant support system can be used in most any gardening situation.

(e) Adding this system to a garden that has already grown and needs support will not disturb the vines and the produce of plants. The vertical supports will not displace plants and there are no limitations as to where they have to be placed in relation to one another. Twine can be added without disturbing the plant. Twine can be placed exactly where support is needed for optimal plant growth.

(f) The design of this plant support system allows it to be easily moved and changed.

(g) This plant support allows the leaves and produce to be in their natural relationship to one another to maximize their natural disposition to produce well.

(h) This plant support system is composed of one unit, is simple in design, and needs no prior assembly, therefore it is likely to be inexpensive to produce.

(i) Because this system is composed of one simple unit and needs no assembly it will be produced in a variety of sizes with fewer adjustments to production machinery.

(j) Because this system is composed of generally flat vertical supports and twine, which can be rolled into a ball when not in use, it can be stored and organized in a small space. Loops and arc shapes at the top ensure that they can be stored on a hook or similar situation, which saves space in storage areas.

(k) This simple plant support system can be produced in green as well as other colors and is curvy rather than mechanical looking therefore it is attractive and blends into the gardening area well.

CONCLUSION, RAMIFICATIONS, AND SCOPE

Thus the reader will see that the plant support system of the invention provides a versatile, portable, easily storable, attractive, economical device that can be used freely in planting areas of any size for plants of any variety and at almost any time in their growth. While my above description contains many specifications, these should not be construed as limitations on the scope of the invention, but rather as an exemplification of one preferred embodiment thereof. Many other variations are possible. The shaped length is not limited to rounded corrugations but can be made in zigzags, loops, other shapes and other combinations thereof, as long as the construction is unitary and without joints or soldering. The support system can be made in any height, restricted only by the strength and thickness of the material used. The material used can be plastic, metal, recycled materials, and molded plastic to name a few possible materials. Accordingly the scope of the invention should be determined not by the embodiments illustrated but by the appended claims and their legal equivalents.

I claim:

1. A plant support, consisting of:
   (a) a twine, cord, wire, string or other suitable material
   (b) Two or more single-leg stakes made of suitable material and thickness, each having:
      (1) a straight length that will set upright into the soil connected to
      (2) a shaped length that is substantially curvilinear corrugation that extends substantially the length of said two or more single-leg stakes suitably shaped so that when said twine, cord, wire, string or other suitable material is attached at predetermined heights along said shaped length said twine, cord, wire, string or other suitable material will not slip up or down, and
      a top closed shape enclosing means, set on the same plane as said shaped length, to keep said twine, cord, wire, string or other suitable material from slipping off said plant support
   (c) said two or more stakes are placed into the soil at predetermined distances from each other in predetermined proximity to plants
   (d) said twine, cord, wire, string or other suitable material is attached along said shaped length going from one said two or more stakes to each of the others of said two or more stakes spaced as needed whereby said two or more stakes provide vertical support and said twine, cord, wire, string or other suitable material connecting said two or more stakes to provide substantially closed support cage for growing plants.

* * * * *